United States Patent [19]

Solberg

[11] 4,246,471
[45] Jan. 20, 1981

[54] DISTANCE MARKER

[76] Inventor: Merle F. Solberg, 183 South Ave., Hampshire, Ill. 60140

[21] Appl. No.: 1,441

[22] Filed: Jan. 8, 1979

[51] Int. Cl.³ .................... G06M 3/14; G06F 15/20
[52] U.S. Cl. ...................... 235/92 DN; 235/92 EV
[58] Field of Search ....... 235/92 DN, 92 MP, 92 EV, 235/92 PE, 92 EA, 95 R, 97; 364/424, 460

[56] References Cited

U.S. PATENT DOCUMENTS

| 2,561,512 | 7/1951 | Holmes et al. | 235/92 DN |
| 3,226,021 | 12/1965 | Dusinberre et al. | 235/92 DN |
| 3,233,827 | 2/1966 | Byles | 235/92 DN |
| 4,068,307 | 1/1978 | Floyd et al. | 235/92 PE |
| 4,145,605 | 3/1979 | Marcus | 235/92 EV |

Primary Examiner—Joseph M. Thesz
Attorney, Agent, or Firm—Daniel Jay Tick

[57] ABSTRACT

A drive shaft is interposed between the speedometer and odometer and the speedometer cable of an automotive vehicle and coupled to and rotatable therewith in a manner whereby the drive shaft rotates at the same speed as the cable. A cam shaft is rotatably mounted in operative proximity with the drive shaft and is coupled thereto by gears. A cam wheel is affixed to and rotatable with the cam shaft. The cam wheel has a cylindrical rim and a cam mounted on the rim and extending therefrom. The cam shaft is coupled to the drive shaft for rotating the cam wheel one revolution per unit distance. Electrical contacts in operative proximity with the cam are in spaced open relation out of electrical contact when spaced from the cam. The cam causes the electrical contacts to move into electrical contact once per revolution of the cam wheel thereby closing the electrical contacts once per unit distance represented by a revolution of the cam wheel. A two-way counter is electrically connected to the electrical contacts via a manually-operated two-position switch and counts one count up when the switch is in one of its positions and each time the electrical contacts are closed and counts one count down when the switch is in the other of its positions and each time the electrical contacts are closed. An indicator coupled to the counter indicates the count of the counter and thereby a desired distance.

2 Claims, 5 Drawing Figures

DISTANCE MARKER

BACKGROUND OF THE INVENTION

The present invention relates to a distance marker. More particularly, the invention relates to a distance marker for an automotive vehicle having a speedometer cable and a speedometer and an odometer coupled to the speedometer cable for indicating the velocity of the vehicle and the distance travelled by the vehicle.

Travellers in automotive vehicles are often interested in knowing mileages between different points through which they pass. Most people do not care to go to the trouble of noting odometer readings at various points and calculating the differences in order to determine the distance travelled between such points. Furthermore, it is quite often necessary for a traveller in an automotive vehicle to know exactly where he is on a road, so that he may telephone or radio for assistance and be assured of a rapid response by repairmen, police, or the like.

The principal object of the invention is to provide a distance marker of simple structure which indicates any desired distance such as, for example, the distance travelled between two points.

An object of the invention is to provide a distance marker of simple structure, which is inexpensive in manufacture, installed with facility and convenience in any type of automotive vehicle, and accurately indicates the distance travelled between selected points.

Another object of the invention is to provide a distance marker of simple structure, which is inexpensive in manufacture, installed with facility and convenience in an automotive vehicle, and functions efficiently, effectively and reliably to indicate any desired distance travelled by the vehicle, thereby indicating the exact location of the vehicle on a specific road at any time.

Still another object of the invention is to provide a distance marker for an automotive vehicle, which distance marker indicates distance travelled by the vehicle either positively or negatively, as desired, whereby the marker either adds distance units to the overall indication or subtracts distance units from the overall indication.

The distance marker of the invention includes an indicator which may be set to correspond with a mile marker on a road, highway, or the like, and may be switched to count up or count down, as the case may be, to maintain the indicator in exact correspondence with the mile markers.

BRIEF SUMMARY OF THE INVENTION

In accordance with the invention, a distance marker for an automotive vehicle having a speedometer cable and a speedometer and an odometer coupled to the speedometer cable for indicating the velocity of the vehicle and the distance travelled by the vehicle, comprises a drive shaft interposed between the speedometer and odometer and the speedometer cable and coupled to and rotatable therewith in a manner whereby the drive shaft rotates at the same speed as the cable. A drive gear is affixed to and rotatable with the drive shaft. A cam shaft is rotatably mounted in operative proximity with the drive gear. A cam wheel is affixed to and rotatable with the cam shaft. The cam wheel has a cylindrical rim and a cam mounted on the rim and extending therefrom. Coupling gears are affixed to the cam shaft and interposed between the cam and drive shafts for rotating the cam wheel one revolution per unit distance. Electrical contacts are in operative proximity with the cam. The electrical contacts are in spaced open relation out of electrical contact when spaced from the cam and the cam causes the electrical contacts to move into electrical contact once per revolution of the cam wheel thereby closing said electrical contacts once per unit distance represented by a revolution of the cam wheel. A manually-operated two-position switch is provided. A two-way counter is electrically connected to the electrical contacts via the switch for counting one count up when the switch is in one of its positions and each time the electrical contacts are closed and for counting one count down when the switch is in the other of its positions and each time the electrical contacts are closed. An indicator is coupled to the counter for indicating the count of the counter and thereby a desired distance.

The electrical contacts include first and second electrically conductive resilient leaves mounted in spaced operative proximity with each other. A first electrical contact is mounted on the first leaf facing the second and a second electrical contact mounted on the second leaf facing the first. The first leaf is longer than the second leaf and is moved, once per revolution of the cam wheel, by the cam to space the first and second electrical contacts a greater distance apart than they are normally spaced whereby upon release of the first leaf by the cam, the first leaf is moved by its resiliency toward the second leaf to an extent whereby the first and second electrical contacts are instantaneously in electrical contact. The first leaf is then moved back by its resiliency to its normal position in which the first and second electrical contacts are spaced from each other.

The cam is substantially wedge-shaped.

The cam wheel and the cam consist of electrically insulative material.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
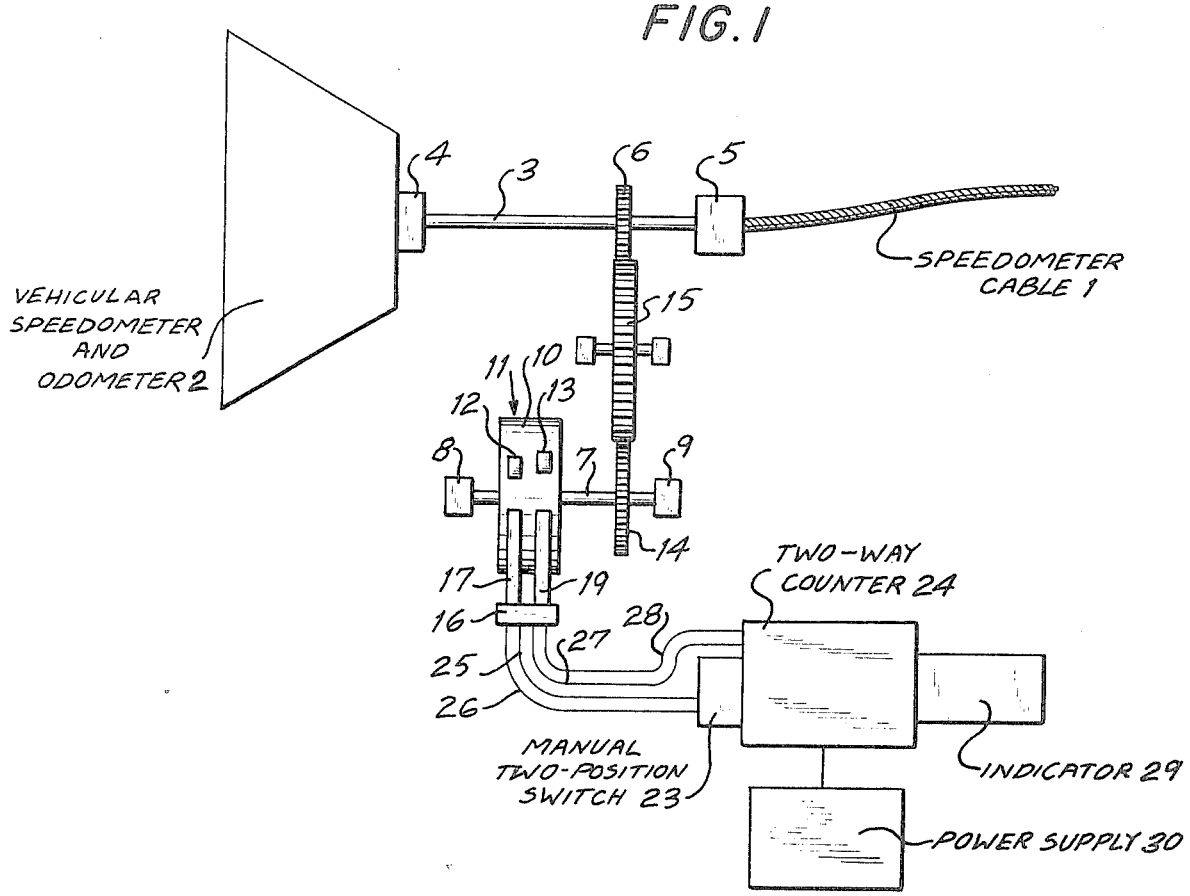
FIG. 1 is a schematic and block diagram of an embodiment of the distance marker of the invention.

The distance marker of the invention is for an automotive vehicle having a speedometer cable 1 and a speedometer and an odometer 2 coupled to the speedometer cable, as shown in FIG. 1, for indicating the velocity of the vehicle and the distance travelled by the vehicle.

The distance marker of the invention comprises a drive shaft 3 interposed between the speedometer and odometer 2 and the speedometer cable 1, as shown in FIG. 1, and coupled to, and rotatable therewith in a manner whereby said drive shaft rotates at the same speed as said cable. This is accomplished by any suitable couplings and bearing combinations 4 and 5 (FIG. 1).

A drive gear 6 is affixed to, and rotatable with, the drive shaft 3 (FIG. 1). A cam shaft 7 is rotatably mounted in operative proximity with the drive gear 6 by any suitable bearing devices 8 and 9 (FIG. 1).

A cam wheel 10 (FIGS. 1 to 5) is affixed to, and rotatable with, the cam shaft 7, as shown in FIG. 1, and has a cylindrical rim 11 (FIGS. 1 to 5). A cam 12 is mounted on the rim 11 of the cam wheel 10 and extends therefrom in the manner shown in FIGS. 2 to 5. The cam wheel 10 and the cam 12 preferably consist of electrically insulative material of any suitable type such as, for example, plastic. The cam 12 is substantially wedge-shaped.

An additional cam 13 (FIG. 1) is mounted on the rim 11 of the cam wheel 10 in laterally spaced relation with the cam 12 and extends therefrom in the same manner as the cam 12. Both cams 12 and 13 are preferably of identical configuration. A coupling gear 14 is affixed to the cam shaft 7 and rotatable therewith and a coupling gear 15 is interposed between said cam shaft and the drive shaft 3 and couples the drive gear 6 to the coupling gear 14 to rotate the cam wheel 10 one revolution per unit distance, such as, for example, one revolution per one tenth mile. Any suitable coupling gear arrangement may be utilized.

Any suitable number of cams may be mounted on the rim 11 of the cam wheel 10. Each cam may control the opening and closing of any suitable number of electrical circuits.

Electrical contacts 16 are provided in operative proximity with the cams 12 and 13 (FIGS. 1 to 5). The electrical contacts 16 comprise first and second electrically conductive resilient leaves 17 and 18 (FIGS. 2 to 5) mounted in spaced operative proximity with each other and third and fourth electrically conductive resilient leaves, of which only the leaf 19 is shown in FIG. 1, mounted in spaced operative proximity with each other. A first electrical contact 20 is mounted on the first leaf 17 facing the second leaf 18 and a second electrical contact 21 is mounted on said second leaf facing said first leaf, as shown in FIGS. 2 to 5. The third and fourth leaves (not shown in the FIGS.) are provided with third and fourth electrical contacts in an identical manner to the first and second leaves 17 and 18.

The first leaf 17 is longer than the second leaf 18, as shown in FIGS. 2 to 5. The third leaf 19 (FIG. 1) is longer than the fourth leaf (not shown in the FIGS.).

Figure 2:
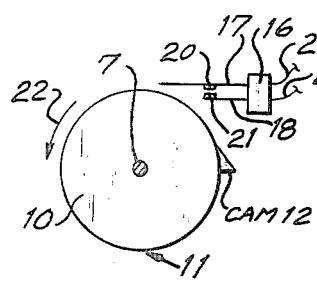
FIGS. 2, 3, 4 and 5 are schematic diagrams illustrating the operation of the cam wheel and electrical contacts of the distance marker of the invention.
Figure 4:
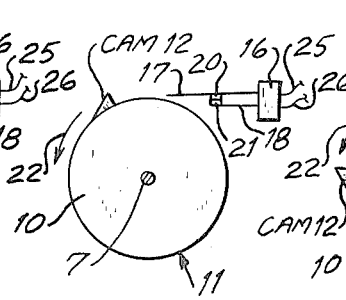
Figure 5:
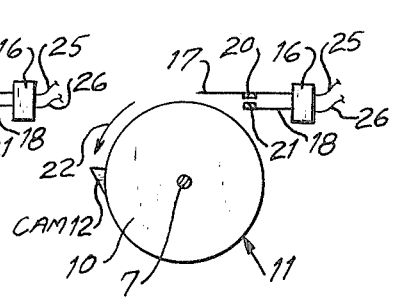

The electrical contacts are in spaced open relation, out of electrical contact, when spaced from the cam 12, as shown in FIGS. 2 and 5. The cam 12 causes the electrical contacts to move into electrial contact once per revolution of the cam wheel 10, as shown in FIG. 4, thereby closing the electrical contacts once per unit distance, represented by a revolution of said cam wheel.

Figure 3:
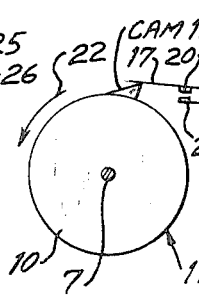

Thus, the first leaf 17 is moved, as shown in FIG. 3, once per revolution of the cam wheel 10, by the cam 12, to space the first and second electrical contacts 20 and 21 a greater distance apart than they are normally spaced. Then, upon release of the first leaf 17 by the cam 12, as shown in FIG. 4, said first leaf is moved by its resiliency toward the second leaf 18 to an extent whereby said first and second electrical contacts are instantaneously in electrical contact. The first leaf 17 is then moved back, by its resiliency, to its normal position, as shown in FIGS. 5 and 2, in which the first and second electrical contacts 20 and 21 are spaced from each other.

The third leaf 19 is moved once per revolution of the cam wheel 10, by the cam 13, to space the third and fourth electrical contacts a greater distance apart than they are normally spaced. Then upon release of the third leaf 19 by the cam 13, said third leaf is moved by its resiliency to the fourth leaf to an extent whereby said third and fourth electrical contacts are instantaneously in electrical contact. The third leaf 19 is then moved back, by its resiliency, to its normal position, in which the third and fourth electrical contacts are spaced from each other.

In the examples shown in FIGS. 2 to 5, the cam wheel 10 is assumed to be rotating counterclockwise in the direction of an arrow 22. In FIG. 2, the circuits of the first and second leaves 17 and 18 and that of the third and fourth leaves are open, in normal operation. In FIG. 3, the cam 12 is moving the first leaf 17 and the cam 13 is moving the third leaf 19 to a greater distance from the rim 11 of the cam wheel 10 than its normal distance. In FIG. 4, the first leaf 17 and the second leaf 18 are moved, by their inherent resiliency, closer to each other than normal, so that the first and second electrical contacts 20 and 21 make electrical contact with each other. The third and fourth leaves are also moved closer to each other than normal so that the third and fourth electrical contacts make electrical contact with each other a moment later. In FIG. 5, the first leaf 17 and the second leaf 18 have been returned to their normal positions wherein their electrical contacts are spaced from each other due to their inherent resiliency. The electrical contacts of the third and fourth leaves are also returned to their normal positions, an instant later, due to their inherent resiliency, so that their electrical contacts are also spaced from each other.

The cams 12 and 13 are slightly staggered (FIG. 1), so that the second circuit, controlled by the cam 13, is closed an instant or a moment later than the first circuit, controlled by the cam 12.

A manually-operated two-position switch 23 of any suitable type is provided, as shown in FIG. 1. The two-position switch 23 may thus comprise a double pole double throw switch.

A two-way counter 24 of any suitable type is electricaily connected to the electrical contacts via the switch 23, as shown in FIG. 1, and functions to count one count up, or positively, when said switch is in one of its two positions and each time the electrical contacts are closed. The counter 24 counts one count down, or negatively, when the switch 23 is in the other of its positions and each time the electrical contacts are closed.

Thus, as shown in FIGS. 1 to 5, the first leaf 17 is electrically connected to the two-way counter 24 via an electrical conductor 25 and the manually-operated two-position switch 23. The second leaf 18 is electrically connected to the counter 24 via an electrical conductor 26 and the switch 23, as shown in FIGS. 1 to 5. The third leaf 19 is electrically connected to the counter 24 via an electrical conductor 27 (FIG. 1). The fourth leaf (not shown in the FIGS.) is electrically connected to the counter 24 via an electrical conductor 28 (FIG. 1).

When the switch 23 is in a first of its two positions, and the electrical contacts 20 and 21 of the first and second leaves 17 and 18, respectively, are in electrical contact, the counter 24 counts one count up.

When the manually-operated two-position switch 23 is in its second position and the electrical contacts 20 and 21 of the first and second leaves 17 and 18 respectively, are in electrical contact, the two-way counter 24 counts one count down.

An indicator 29 of any suitable type (FIG. 1) is coupled to the two-way counter 24 and indicates the count of said counter and thereby a desired distance.

A power supply 30 of any suitable type provides the necessary electrical power to operate the distance marker of the invention by providing a low voltage such as, for example, 12 volts. This voltage enables a count signal to be produced each time the two circuits are closed in series.

While the invention has been described by means of a specific example and in a specific embodiment, I do not wish to be limited thereto, for obvious modifications will occur to those skilled in the art without departing from the spirit and scope of the invention.

I claim:

1. A distance marker for an automotive vehicle having a speedometer cable and a speedometer and an odometer coupled to the speedometer cable for indicating the velocity of the vehicle and the distance travelled by the vehicle in unit distances, said distance marker comprising a drive shaft interposed between the speedometer and odometer and the speedometer cable and coupled to and rotatable therewith in a manner whereby said drive shaft rotates at the same speed as said cable;

drive gear means affixed to and rotatable with said drive shaft;

a cam shaft rotatably mounted in operative proximity with said drive gear means;

a cam wheel affixed to and rotatable with said cam shaft, said cam wheel having a cylindrical rim and a cam mounted on said rim and extending therefrom;

coupling gear means affixed to said cam shaft and interposed between said cam and drive shafts for rotating said cam wheel one revolution per unit distance;

electrical contact means in operative proximity with said cam, said electrical contact means being in spaced open relation out of electrical contact when spaced from said cam and said cam causes said electrical contact means to move into electrical contact once per revolution of said cam wheel thereby closing said electrical contact means once per unit distance represented by a revolution of said cam wheel, said electrical contact means including first and second electrically conductive resilient leaves mounted in spaced operative proximity with each other, a first electrical contact mounted on the first leaf facing the second and a second electrical contact mounted on the second leaf facing the first, said first leaf being longer than said second leaf and being moved, once per revolution of said cam wheel, by said cam to space the first and second electrical contacts a greater distance apart than they are normally spaced whereby upon release of said first leaf by said cam, said first leaf is moved by its resiliency toward said second leaf to an extent whereby said first and second electrical contacts are instantaneously in electrical contact, said first leaf then being moved back by its resiliency to its normal position in which said first and second electrical contacts are spaced from each other;

a manually-operated two-position switch;

a two-way counter electrically connected to said electrical contact means via said switch for counting one count up when said switch is in one of its positions and each time said electrical contact means is closed and for counting one count down when said switch is in the other of its positions and each time said electrical contact means is closed; and an indicator coupled to said counter for indicating the count of said counter and thereby a desired distance.

2. A distance marker as claimed in claim 1, wherein said cam wheel and said cam consist of electrically insulative material.

* * * * *